UNITED STATES PATENT OFFICE.

HAROLD B. NYE, OF CLEVELAND, OHIO.

PROCESS OF UTILIZING TIN-SCRAP.

SPECIFICATION forming part of Letters Patent No. 488,796, dated December 27, 1892.

Application filed March 21, 1892. Serial No. 425,694. (No specimens.)

*To all whom it may concern:*

Be it known that I, HAROLD B. NYE, a citizen of the United States, residing at Cleveland, in the county of Cuyahoga and State of Ohio, have invented certain new and useful Improvements in Processes for Utilizing Tin-Scrap and other Sheet-Metal Scrap; and I do hereby declare the following to be a full, clear, and exact description of the invention, such as will enable others skilled in the art to which it appertains to use and apply the same.

It is well known that a very large amount of scrap tin, old tinware, tin cans, galvanized iron scrap, and scrap sheet metal of all kinds is annually thrown out as waste, the larger part of course being produced in various manufacturing industries. The iron of such scrap, particularly of tin scrap, is commonly of excellent quality, and if utilized would form a valuable product, and the annual saving would be very great. The object of my invention is to effect such saving, and it consists in a method of utilizing tin-scrap and sheet metal scrap, whether wholly or partially free from other coating metal, by combining the same with pig iron or other iron and removing the coating metal which is more fusible than iron by oxidation and combustion in the manner hereinafter described.

In the tinning of sheet iron by the ordinary dipping process a certain portion of the tin forms an alloy with the iron while the larger portion remains as a mere coating upon the surface of this alloy. The same thing occurs in the coating of iron with zinc or other metal by dipping. A number of processes have been devised for recovering the metallic tin from waste tin scrap, none of them completely successful, and some processes have been proposed for utilizing the iron scrap from which the tin has been partially recovered by some of the processes devised for that purpose. In all processes of recovering the tin from tin scraps it is the portion forming the coating only that is removed, that portion forming the alloy with the iron being unaffected, and going into the product when such scraps, after the removal of the tin coating, have been utilized for conversion into ingots or blooms. None of such processes hitherto employed have been successful on a commercial scale, owing among other things to the expense involved in handling the scrap, the cost of materials used in recovering the tin, the limited scale on which the operations must be conducted, or the inferior quality of the iron produced, as it is well known that the presence of even a small proportion of tin imparts to cast iron a brittleness which renders it useless for most purposes.

I overcome the foregoing difficulties by employing a process by which the scrap metal can be treated in large quantities and at a low cost for labor, and in which the previous removal of the tin or other coating metal by a separate treatment is not required, whereby the cost of reagents and the numerous handlings of the scrap metal is dispensed with, and finally the complete removal of the tin or other coating metal from the final product is effected, so that a commercially valuable product is obtained.

In carrying out my process I proceed as follows: I take by preference the iron scrap left from any of the tin scrap treating processes after the removal of the tin, which, as it contains somewhat less tin than untreated scrap, is more cheaply and quickly utilized, but if such be not obtainable I take the untreated scrap tin, or old tinware, cans and waste tin or other coated metal, as free as practicable from dirt and rust, and it is preferable, though not essential, that the scrap be compressed for convenience in handling. The scrap is melted in any suitable melting furnace or cupola with pig iron or other iron of such qualities and in such proportions that the iron bath, without the admixture of the tin or other coating metal of the scrap, would be suitable for treatment in the ordinary basic or acid Bessemer process, the basic or acid Siemens-Martin process, or the ordinary puddling and boiling process. The proportion of scrap tin, galvanized scrap, or other coated scrap will of course vary with the extent to which the removal of the coating metal has been effected, but in general the proportion of tin scrap or other coated scrap should not be greater than will cause the proportion of tin or other coating metal in the bath to reach about ten or fifteen per cent. of the bath, for although a considerably larger percentage can be got rid of in the subsequent steps of the process, the economy of the process is greater when the percentage is lower, say not above ten per cent. The melted bath so produced consists of an alloy of iron with tin, zinc, lead, and sometimes traces of bismuth, antimony &c from the coating metal or the solder used in forming tinware &c, together with the ordinary impurities, such as phosphorus and sulphur of the pig or other iron, but only the tin or zinc and lead are present in noticeable proportion with the iron, and all of the impurities may be readily removed from the iron bath by oxidation by agitating the bath and at the same time exposing it to the oxidizing effect of blasts of air forced into or upon it. The melted metal is preferably now run into a Bessemer converter, and the oxidizing blast is turned on, the proper proportion of spiegel or ferro manganese being afterward added. The tin, lead, zinc and all impurities introduced into the charge from the scrap metal will be oxidized by the blast and will pass into the slag, or be in part volatilized and carried out and burned with the escaping gas, whose color and behavior will indicate in the usual manner the complete purification of the charge, whereupon the charge, now converted into steel, is to be cast in the usual way. Instead of the Bessemer converter, a Siemens-Martin furnace or a puddling furnace may be used to effect the oxidation of the tin or other metals alloyed with the iron, the oxidation being effected by the oxygen of the blasts of air forced in. It is not material to the application of my process which type of furnace is employed, as

What I claim as my invention and desire to secure by Letters Patent is.

The process of utilizing tin scrap and other scrap metal of coated iron, which consists in melting said scraps into an alloy with pig or other iron and removing the tin and other metals and impurities alloyed with the iron by oxidation by forcing blasts of air under pressure into intimate contact with all parts of the molten alloy, substantially as described.

In witness whereof I hereto affix my signature.

HAROLD B. NYE.

In presence of—
  WM. G. TAYLOR,
  LOREN PRENTISS.